US012536290B2

(12) United States Patent
Cheng et al.

(10) Patent No.: US 12,536,290 B2
(45) Date of Patent: Jan. 27, 2026

(54) DETECTING ARTIFICIAL INTELLIGENCE GENERATED COMPUTER CODE (71) Applicant: NEC Laboratories America, Inc., Princeton, NJ (US)

(72) Inventors: Wei Cheng, Princeton Junction, NJ (US); Xianjun Yang, Santa Barbara, CA (US); Haifeng Chen, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 65 days.

(21) Appl. No.: 18/731,845

(22) Filed: Jun. 3, 2024

(65) Prior Publication Data
US 2024/0419801 A1 Dec. 19, 2024

Related U.S. Application Data (60) Provisional application No. 63/521,191, filed on Jun. 15, 2023.

(51) Int. Cl.
G06F 21/57 (2013.01)
G06F 11/362 (2025.01)

(52) U.S. Cl.
CPC .......... G06F 21/57 (2013.01); G06F 11/3624 (2013.01); G06F 2221/033 (2013.01)

(58) Field of Classification Search
CPC .... G06F 8/30; G06F 8/75; G06N 7/01; G06N 20/00
See application file for complete search history.

(56) References Cited

U.S. PATENT DOCUMENTS

| | | | | |
|---|---|---|---|---|
| 10,311,218 B2* | 6/2019 | Aharoni | .................. | G06F 21/31 |
| 11,489,874 B2* | 11/2022 | Roth | .................... | H04L 9/0825 |
| 12,229,535 B2* | 2/2025 | Kaitha | .................... | G06N 3/08 |
| 2019/0354676 A1* | 11/2019 | Willis | .................... | H04L 63/12 |
| 2022/0206786 A1* | 6/2022 | Silva | ........................ | G06F 8/36 |

OTHER PUBLICATIONS

Allal, L. B., Li, R., Kocetkov, D., Mou, C., Akiki, C., Ferrandis, C. M., . . . & von Werra, L. (Jan. 9, 2023). SantaCoder: don't reach for the stars!. arXiv preprint arXiv:2301.03988.

Bavarian, M., Jun, H., Tezak, N., Schulman, J., McLeavey, C., Tworek, J., & Chen, M. (Jul. 28, 2022). Efficient training of language models to fill in the middle. arXiv preprint arXiv:2207.14255.

(Continued)

Primary Examiner — Beemnet W Dada
(74) Attorney, Agent, or Firm — Vincent Duffy; Joseph Kolodka (57) ABSTRACT Systems and methods for detecting artificial intelligence (AI) generated computer code. Lines of code can be masked from a candidate code to obtain perturbed codes. Missing code can be generated from the perturbed codes by employing an AI code generator model to obtain machine-filled codes. Probabilities of the candidate code probability and the machine-filled codes as AI-generated can be predicted by employing a surrogate model. The candidate code can be distinguished as AI-generated by comparing the probabilities against a detection threshold to obtain detection results.

20 Claims, 5 Drawing Sheets

(56) References Cited

OTHER PUBLICATIONS

Bian, N., Liu, P., Han, X., Lin, H., Lu, Y., He, B., & Sun, L. (May 8, 2023). A drop of ink may make a million think: The spread of false information in large language models. arXiv preprint arXiv:2305.04812.

Bubeck, S., Chandrasekaran, V., Eldan, R., Gehrke, J., Horvitz, E., Kamar, E., . . . & Zhang, Y. (Mar. 2023). Sparks of artificial general intelligence: Early experiments with gpt-4. arXiv preprint arXiv:2303.12712.

Chai, Y., Wang, S., Pang, C., Sun, Y., Tian, H., & Wu, H. (Dec. 13, 2022). ERNIE-Code: Beyond english-centric cross-lingual pretraining for programming languages. arXiv preprint arXiv:2212.06742.

Chen, M., Tworek, J., Jun, H., Yuan, Q., Pinto, H. P. D. O., Kaplan, J., . . . & Zaremba, W. (Jul. 7, 2021). Evaluating large language models trained on code. arXiv preprint arXiv:2107.03374.

Chen, X., Lin, M., Scharli, N., & Zhou, D. (Apr. 11, 2023). Teaching large language models to self-debug. arXiv preprint arXiv:2304.05128.

Clement, C. B., Drain, D., Timcheck, J., Svyatkovskiy, A., & Sundaresan, N. (Oct. 7, 2020). PyMT5: multi-mode translation of natural language and Python code with transformers. arXiv preprint arXiv:2010.03150.

Dey, A., Bhattacharya, S., & Chaki, N. (Mar. 5, 2019). Software watermarking: Progress and challenges. INAE Letters, 4, 65-75.

Dugan, L., Ippolito, D., Kirubarajan, A., Shi, S., & Callison-Burch, C. (Jun. 26, 2023). Real or fake text ?: Investigating human ability to detect boundaries between human-written and machine-generated text. In Proceedings of the AAAI Conference on Artificial Intelligence (vol. 37, No. 11, pp. 12763-12771).

Fried, D., Aghajanyan, A., Lin, J., Wang, S., Wallace, E., Shi, F., . . . & Lewis, M. (Apr. 12, 2022). Incoder: A generative model for code infilling and synthesis. arXiv preprint arXiv:2204.05999.

Gao, L., Biderman, S., Black, S., Golding, L., Hoppe, T., Foster, C., . . . & Leahy, C. (Dec. 31, 2020). The pile: An 800gb dataset of diverse text for language modeling. arXiv preprint arXiv:2101.00027.

Hamilton, J., & Danicic, S. (Feb. 21, 2011). A survey of static software watermarking. In 2011 World Congress on Internet Security (WorldCIS—2011) (pp. 100-107). IEEE.

Hanley, H. W., & Durumeric, Z. (May 16, 2023). Machine-made media: Monitoring the mobilization of machine-generated articles on misinformation and mainstream news websites. arXiv preprint arXiv:2305.09820.

Hendrycks, D., Basart, S., Kadavath, S., Mazeika, M., Arora, A., Guo, E., . . . & Steinhardt, J. (May 20, 2021). Measuring coding challenge competence with apps. arXiv preprint arXiv:2105.09938.

Christo, L. (Dec. 8, 2021) Training CodeParrot from Scratch. https://huggingface.co/blog/codeparrot.

Kirchenbauer, J., Geiping, J., Wen, Y., Katz, J., Miers, I., & Goldstein, T. (Jul. 3, 2023). A watermark for large language models. In International Conference on Machine Learning (pp. 17061-17084). PMLR.

Krishna, K., Song, Y., Karpinska, M., Wieting, J., & Iyyer, M. (Feb. 13, 2024). Paraphrasing evades detectors of ai-generated text, but retrieval is an effective defense. Advances in Neural Information Processing Systems, 36.

Kumar, S., Balachandran, V., Njoo, L., Anastasopoulos, A., & Tsvetkov, Y. (Oct. 14, 2022). Language generation models can cause harm: So what can we do about it? an actionable survey. arXiv preprint arXiv:2210.07700.

Lee, T., Hong, S., Ahn, J., Hong, I., Lee, H., Yun, S., . . . & Kim, G. (May 24, 2023). Who wrote this code? watermarking for code generation. arXiv preprint arXiv:2305.15060.

Li, Y., Choi, D., Chung, J., Kushman, N., Schrittwieser, J., Leblond, R., . . . & Vinyals, O. (Dec. 9, 2022). Competition-level code generation with alphacode. Science, 378(6624), 1092-1097.

Liu, J., Xia, C. S., Wang, Y., & Zhang, L. (Feb. 13, 2024). Is your code generated by chatgpt really correct? rigorous evaluation of large language models for code generation. Advances in Neural Information Processing Systems, 36.

Luo, Z., Xu, C., Zhao, P., Sun, Q., Geng, X., Hu, W., . . . & Jiang, D. (Jun. 14, 2023). Wizardcoder: Empowering code large language models with evol-instruct. arXiv preprint arXiv:2306.08568.

Ma, H., Jia, C., Li, S., Zheng, W., & Wu, D. (Mar. 29, 2019). Xmark: dynamic software watermarking using Collatz conjecture. IEEE Transactions on Information Forensics and Security, 14(11), 2859-2874.

Mireshghallah, N., Mattern, J., Gao, S., Shokri, R., & Berg-Kirkpatrick, T. (May 17, 2023). Smaller language models are better black-box machine-generated text detectors. arXiv preprint arXiv:2305.09859.

Mitchell, E., Lee, Y., Khazatsky, A., Manning, C. D., & Finn, C. (Jul. 3, 2023). Detectgpt: Zero-shot machine-generated text detection using probability curvature. In International Conference on Machine Learning (pp. 24950-24962). PMLR.

Ni, A., Iyer, S., Radev, D., Stoyanov, V., Yih, W. T., Wang, S., & Lin, X. V. (Jul. 3, 2023). Lever: Learning to verify language-to-code generation with execution. In International Conference on Machine Learning (pp. 26106-26128). PMLR.

Nijkamp, E., Pang, B., Hayashi, H., Tu, L., Wang, H., Zhou, Y., . . . & Xiong, C. (Mar. 25, 2022). Codegen: An open large language model for code with multi-turn program synthesis. arXiv preprint arXiv:2203.13474.

Oshikawa, R., Qian, J., & Wang, W. Y. (Nov. 2, 2018). A survey on natural language processing for fake news detection. arXiv preprint arXiv:1811.00770.

Pan, Y., Pan, L., Chen, W., Nakov, P., Kan, M. Y., & Wang, W. Y. (May 23, 2023). On the risk of misinformation pollution with large language models. arXiv preprint arXiv:2305.13661.

Perkins, M., Roe, J., Postma, D., McGaughran, J., & Hickerson, D. (May 29, 2023). Game of tones: faculty detection of GPT-4 generated content in university assessments. arXiv preprint arXiv:2305.18081.

Raffel, C., Shazeer, N., Roberts, A., Lee, K., Narang, S., Matena, M., . . . & Liu, P. J. (Jun. 20, 2020). Exploring the limits of transfer learning with a unified text-to-text transformer. Journal of machine learning research, 21(140), 1-67.

Sun, T., Gaut, A., Tang, S., Huang, Y., ElSherief, M., Zhao, J., . . . & Wang, W. Y. (Jun. 21, 2019). Mitigating gender bias in natural language processing: Literature review. arXiv preprint arXiv:1906.08976.

Touvron, H., Lavril, T., Izacard, G., Martinet, X., Lachaux, M. A., Lacroix, T., . . . & Lample, G. (Feb. 27, 2023). Llama: Open and efficient foundation language models. arXiv preprint arXiv:2302.13971.

Wang, J., Liu, S., Xie, X., & Li, Y. (Apr. 11, 2023). Evaluating AIGC detectors on code content. arXiv preprint arXiv:2304.05193.

Wang, Y., Gong, D., Lu, B., Xiang, F., & Liu, F. (Feb. 27, 2018). Exception handling-based dynamic software watermarking. IEEE Access, 6, 8882-8889.

Wang, Y., Wang, W., Joty, S., & Hoi, S. C. (Sep. 2, 2021). Codet5: Identifier-aware unified pre-trained encoder-decoder models for code understanding and generation. arXiv preprint arXiv:2109.00859.

Xu, F. F., Alon, U., Neubig, G., & Hellendoorn, V. J. (Jun. 13, 2022). A systematic evaluation of large language models of code. In Proceedings of the 6th ACM SIGPLAN International Symposium on Machine Programming (pp. 1-10).

Yang, X., Cheng, W., Petzold, L., Wang, W. Y., & Chen, H. (May 27, 2023). Dna-gpt: Divergent n-gram analysis for training-free detection of gpt-generated text. arXiv preprint arXiv:2305.17359.

Zan, D., Chen, B., Yang, D., Lin, Z., Kim, M., Guan, B., . . . & Lou, J. G. (Jun. 14, 2022). CERT: continual pre-training on sketches for library-oriented code generation. arXiv preprint arXiv:2206.06888.

Zellers, R., Holtzman, A., Rashkin, H., Bisk, Y., Farhadi, A., Roesner, F., & Choi, Y. (Dec. 8, 2019). Defending against neural fake news. Advances in neural information processing systems, 32.

Zhang, K., Wang, D., Xia, J., Wang, W. Y., & Li, L. (Feb. 13, 2024). Algo: Synthesizing algorithmic programs with generated oracle verifiers. Advances in Neural Information Processing Systems, 36.

(56) References Cited

OTHER PUBLICATIONS

Zhang, S., Roller, S., Goyal, N., Artetxe, M., Chen, M., Chen, S., . . . & Zettlemoyer, L. (May 2, 2022). Opt: Open pre-trained transformer language models. arXiv preprint arXiv:2205.01068.

Zheng, Q., Xia, X., Zou, X., Dong, Y., Wang, S., Xue, Y., . . . & Tang, J. (Mar. 30, 2023). Codegeex: A pre-trained model for code generation with multilingual evaluations on humaneval-x. arXiv preprint arXiv:2303.17568.

Li, L., Wang, P., Ren, K., Sun, T., & Qiu, X. (Apr. 27, 2023). Origin tracing and detecting of llms. arXiv preprint arXiv:2304.14072.

Liang, W., Yuksekgonul, M., Mao, Y., Wu, E., & Zou, J. (Jul. 14, 2023). GPT detectors are biased against non-native English writers. Patterns, 4(7).

Liu, Y., Zhang, Z., Zhang, W., Yue, S., Zhao, X., Cheng, X., . . . & Hu, H. (Apr. 16, 2023). Argugpt: evaluating, understanding and identifying argumentative essays generated by gpt models. arXiv preprint arXiv:2304.07666.

Lu, N., Liu, S., He, R., Wang, Q., Ong, Y. S., & Tang, K. (May 18, 2023). Large language models can be guided to evade ai-generated text detection. arXiv preprint arXiv:2305.10847.

Shi, Z., Wang, Y., Yin, F., Chen, X., Chang, K. W., & Hsieh, C. J. (Feb. 23, 2024). Red teaming language model detectors with language models. Transactions of the Association for Computational Linguistics, 12, 174-189.

Weng, L., Liu, S., Zhu, H., Sun, J., Kam-Kwai, W., Han, D., . . . & Chen, W. (Apr. 7, 2024). Towards an understanding and explanation for mixed-initiative artificial scientific text detection. Information Visualization, 14738716241240156.

\* cited by examiner

DETECTING ARTIFICIAL INTELLIGENCE GENERATED COMPUTER CODE

RELATED APPLICATION INFORMATION

This application claims priority to U.S. Provisional App. No. 63/521,191, filed on Jun. 15, 2023, incorporated herein by reference in its entirety.

BACKGROUND

Technical Field

The present invention relates to computer code analysis and more particularly to detecting artificial intelligence generated computer code.

Description of the Related Art

The remarkable progress in large pre-trained large language models (LLMs) has brought machine-generated text closer to human-written text in both fluency and diversity. In addition to generating text, computer code has also been generated using LLMs. As such, this poses a difficult question for distinguishing whether computer code has been machine-generated or human created.

SUMMARY

According to an aspect of the present invention, a computer-implemented method for detecting artificial intelligence (AI) generated computer code is provided, including masking lines of code from a candidate code to obtain perturbed codes, generating missing code from the perturbed codes by employing an AI code generator model to obtain machine-filled codes, predicting probabilities of the candidate code and the machine-filled codes as AI-generated by employing a surrogate model, and distinguishing the candidate code as AI-generated by comparing the probabilities against a detection threshold to obtain detection results.

According to another aspect of the present invention, a system for detecting artificial intelligence (AI) generated computer code is provided, including a memory, and one or more processor devices in communication with the memory configured to mask lines of code from a candidate code to obtain perturbed codes, generate missing code from the perturbed codes by employing an AI code generator model to obtain machine-filled codes, predict probabilities of the candidate code and the machine-filled codes as AI-generated by employing a surrogate model, and distinguish the candidate code as AI-generated by comparing the probabilities against a detection threshold to obtain detection results.

According to yet another aspect of the present invention, a non-transitory computer program product is provided including a computer-readable storage medium including program code for detecting artificial intelligence (AI) generated computer code, wherein the program code when executed on a computer causes the computer to perform masking lines of code from a candidate code to obtain perturbed codes, generating missing code from the perturbed codes by employing an AI code generator model to obtain machine-filled codes, predicting probabilities of the candidate code and the machine-filled codes as AI-generated by employing a surrogate model, and distinguishing the candidate code as AI-generated by comparing the probabilities against a detection threshold to obtain detection results.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with embodiments of the present invention, systems and methods are provided for detecting artificial intelligence (AI) generated computer code.

In an embodiment, a candidate code can be distinguished as AI generated by comparing predicted probabilities of the candidate code and machine-filled codes against a detection threshold. Probabilities of the candidate code and machine-filled codes as AI-generated can be predicted by employing a surrogate model. Machine-filled codes can be obtained by generating missing code from perturbed codes by employing an AI code generator model. Perturbed codes can be obtained by masking lines of code from the candidate code.

In an embodiment, the distinguished candidate code can be flagged as AI-generated to provide transparency to the computer code generation process for a decision-making entity to perform an action. In an embodiment, the action can be securing a healthcare management system handling patient vital data by patching the flagged candidate code for potential security risks.

The remarkable progress in large pre-trained language models (LLMs) has brought machine-generated computer codes closer to human-written code. The proliferation of large language models has revolutionized natural language processing (NLP) tasks, but it has also raised concerns regarding their potential misuse for generating malicious or unethical code. This poses a pressing challenge for distinguishing between the origin of the codes. Meanwhile, research on detection of AI-generated code still lags behind the development of LLMs. Few research efforts have been devoted to this pressing demand in the literature. As AI-generated codes gradually approaches human level, there is some fundamental difficulty in effectively detecting AI-generated codes. This leads to a recent debate of whether AI-generated codes can be detected or not. However, there is still a lack of practical tests on AI-generated code detection, especially in the era of ChatGPT™.

Prior art has failed to explore detection on codes generated from Large Language Models like GPT™-4. Additionally, prior art directed to training-based text detectors fail for code detection, possibly due to the distinctive statistical characteristics inherent in code structures. To solve these shortcomings, the present embodiments propose training-free detection of AI-generated codes to mitigate the risks associated with their indiscriminate usage.

Detecting AI-generated computer code can be useful in various scenarios to ensure code quality, security, and maintainability. Here are some potential applications:

Code Review: AI-generated code might not adhere to best practices, coding conventions, or quality standards. By detecting such code, developers can ensure that human-written code meets the required standards before merging it into the main codebase.

Security Analysis: AI-generated code might contain vulnerabilities, intentional or unintentional. Detecting it can help identify potential security risks, such as injection attacks, buffer overflows, or other vulnerabilities that could be exploited.

Plagiarism Detection: In academic or professional settings, it's important to identify instances where code has been plagiarized or copied from existing sources. By distinguishing between human-written and AI-generated code, educators and organizations can detect instances of plagiarism and ensure intellectual property rights are respected.

Debugging and Maintenance: AI-generated code might be harder to debug or maintain since it lacks the logical consistency and intent of human-written code. By identifying AI-generated sections, developers can focus on those areas during debugging and maintenance to ensure they are adequately addressed.

Automation Testing: AI-generated code might introduce errors or unpredictable behavior that could go undetected in traditional testing. Identifying such code allows for targeted testing strategies to ensure the correctness and reliability of the software being developed.

Code Refactoring and Optimization: AI-generated code might contain redundancies, unnecessary complexity, or inefficient constructs. Detecting these sections can guide developers in refactoring and optimizing the code for improved performance and maintainability.

Intellectual Property Protection: In scenarios where proprietary or sensitive code needs to be safeguarded, detecting AI-generated code can help identify potential leaks or unauthorized use of such code.

Figure 1:
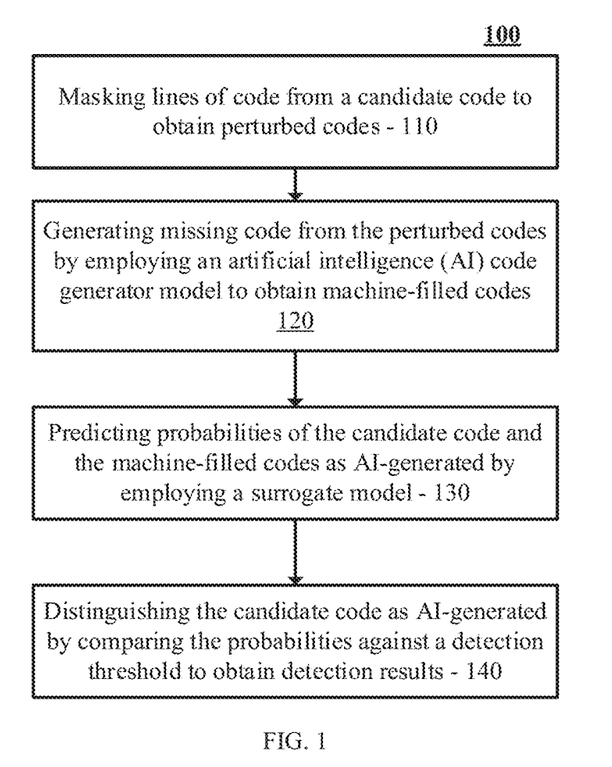
FIG. 1 is a flow diagram illustrating a high-level overview of method for detecting AI-generated computer code, in accordance with an embodiment of the present invention.

Referring now in detail to the figures in which like numerals represent the same or similar elements and initially to FIG. 1, a flow diagram showing a high-level overview of method for detecting AI-generated computer code, in accordance with an embodiment of the present invention.

Figure 2:
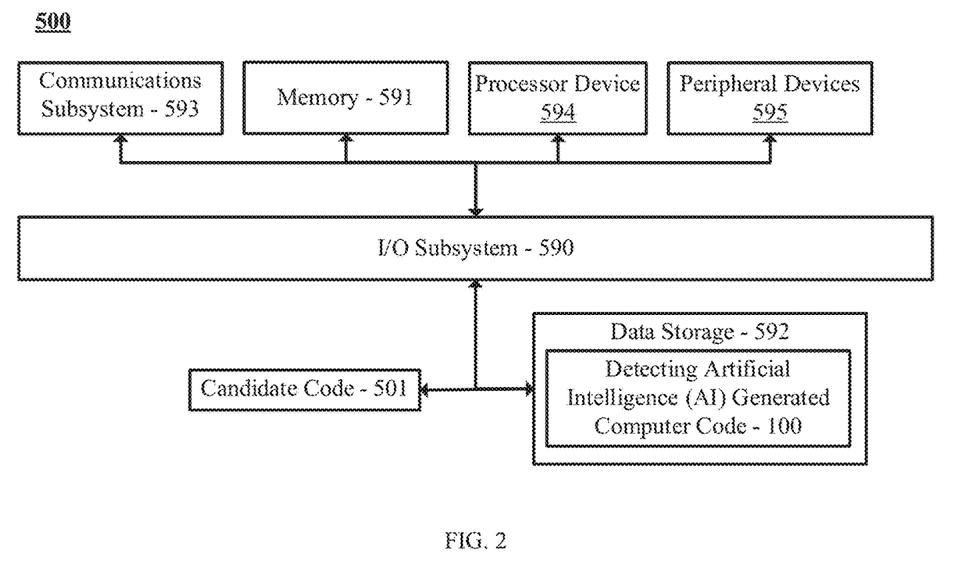
FIG. 2 is a block diagram illustrating a computing system for detecting AI-generated computer code, in accordance with an embodiment of the present invention.
Figure 3:
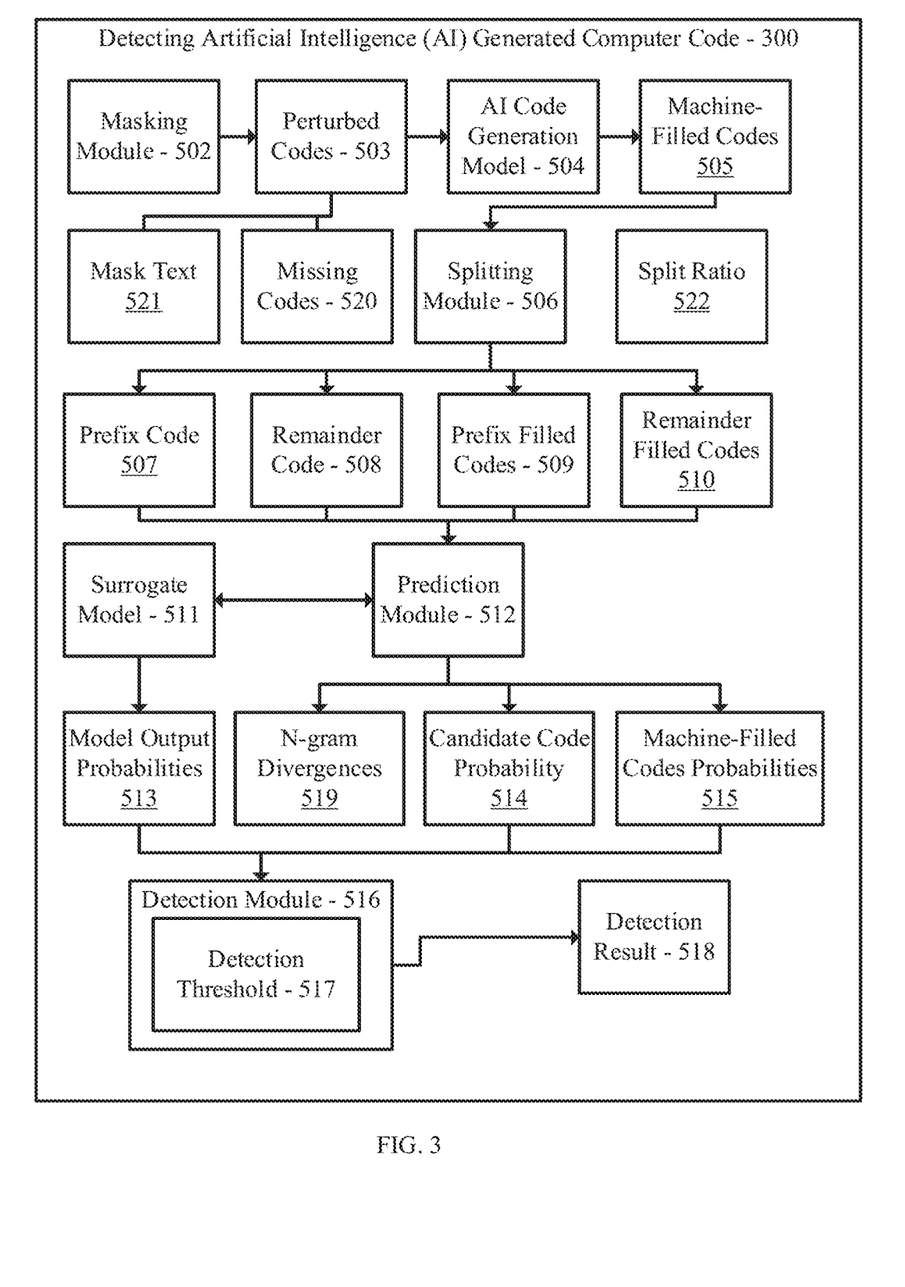
FIG. 3 is a block diagram illustrating a software program for detecting AI-generated computer code, in accordance with an embodiment of the present invention.

In an embodiment, a candidate code 501 (shown in FIG. 2) can be distinguished as AI generated by comparing predicted candidate code probability 514 (shown in FIG. 3) and machine-filled codes probabilities 515 (shown in FIG. 3) against a detection threshold 517 (shown in FIG. 3) to obtain a detection result 518 (shown in FIG. 3). Probabilities that the candidate code 514 and machine-filled codes 515 are AI-generated can be predicted by employing a surrogate model 511 (shown in FIG. 3). Machine-filled codes 505 (shown in FIG. 3) can be obtained by generating missing code 520 (shown in FIG. 3) from perturbed codes 503 (shown in FIG. 3) by employing an AI code generator model 504 (shown in FIG. 4). Perturbed codes 503 can be obtained by masking lines of code from the candidate code 501.

In block 110, lines of code from a candidate code 501 can be masked to obtain perturbed codes 503.

In an embodiment, the candidate code 501 can be a stream of text that is written in a programming language to solve a given problem. The candidate code can be written in various programming languages such as Python™, Java™, C, Swift™, etc. For example, a candidate code 501 can be a computer code written in the Python™ programming language to solve the following problem: "Mr. Chanek gives you a sequence a indexed from 1 to n. Define f (a) as the number of indices where a_i=i. You can pick an element from the current sequence and remove it, then concatenate the remaining elements together. For example, if you remove the 3-rd element from the sequence [4, 2, 3, 1]." The candidate code 501 can be:

```
def main( )
n=int(input( )
a=list(map(int, input( ) split( ))
d=[0]*(n+1)
for i in range(n):
if a[i]−i−1>=0:
d[a[i]−i−1]+=1
print(max(d))
if_name_=='_main_':
main( )
```

In an embodiment, the candidate code 501 can be entered by an entity through peripheral devices 595 (shown in FIG. 2). In another embodiment, the candidate code 501 can be saved and accessed through memory 591 (shown in FIG. 2). In another embodiment, the candidate code 501 can be obtained through a network.

In an embodiment, lines of code can be masked by replacing the lines of code with mask texts 521. For example, the mask text 521 (shown in FIG. 3) can be "<MASK: 1 (e.g., number of mask)>." In an embodiment, lines of code to be masked can be selected randomly. In an embodiment, the number of lines of code to be masked can be an element of a predefined set of numbers m. For example, m ∈ {1, 2, 4, 8, 16, 32, 64, 80, 100}. In another embodiment, the number of lines of code to be masked can be determined by a masking ratio. For example, masking ratio r can be 15% of the total number of lines of code of the candidate code 501.

In an embodiment, the perturbed codes 503 can be the revised version of the candidate code 501 with the mask texts 521. For example, using the example above, the perturbed code 503 can be:

```
def main( )
n=int(input( )
<MASK: 0>
d=[0]*(n+1)
for i in range(n):
if a[i]−i−1>=0:
<MASK: 1>
print(max(d))
if_name_=='_main_':
main( )
```

In block 120, missing code from the perturbed codes 503 can be generated by employing an AI code generator model 504 to obtain machine-filled codes 505.

In an embodiment, missing code 520 from the perturbed codes 503 can be generated by removing the mask texts 521 in the perturbed codes 503 and employing an AI code generator model 504 to fill-in-the-middle (FIM) and obtain machine-filled codes 505. In another embodiment, missing code 520 from the perturbed codes 503 can be generated by directly inputting the perturbed codes 503 to the AI code generator model 504 to perform FIM and obtain machine-filled codes 505. FIM can be a code generation task that can be learned by the AI code generator model 504 to fill the missing code 520 in the perturbed codes 503.

In an embodiment, the AI code generator model 504 can be an autoregressive model such as Incoder-6B. An autoregressive model can be used as it can be pretrained with the FIM task and perform code infilling without reducing its left-to-right generative capabilities. In another embodiment, the AI code generator model 504 can be a generative pre-trained transformer (GPT™-4, GPT™-35-turbo), Large Language Model Association (LLaMa-13B), or text-davinci-edit-001. Other AI code generator models can be employed.

In an embodiment, the AI code generator model 504 can be pre-trained with hand-written codes evaluation dataset such as human evaluated generation model dataset (HumanEval), (HumanEval-X), or CodeContests dataset.

In block 130, the candidate code probability 514 and the machine-filled codes probabilities 515 can be predicted by employing a surrogate model 511.

In an embodiment, a surrogate model 511 can be used to predict whether the candidate code probability 514 and the machine-filled codes probabilities 515 as AI generated.

In an embodiment, the surrogate model 511 can be autoregressive models trained with the FIM task such as Python Code Generator model (PyCodeGPT-110M), "PolyCoder-160M," "CodeParrot-1.5B," and "LLaMa-13B."

In an embodiment, the surrogate model 511 can be pre-trained with hand-written codes evaluation dataset such as a human evaluated generation model dataset (HumanEval), (HumanEval-X), or a CodeContests dataset.

In an embodiment, the candidate code probability 514 can be predicted by the surrogate model by predicting the probability of generating a remainder code 508 given a prefix code 507 obtained from a candidate code 501. In an embodiment, the prefix code 507 and remainder code 508 can be obtained by splitting the candidate code 501 by a split ratio 522 (shown in FIG. 3). In an embodiment, the split ratio 522 can be 90%. In another embodiment, the split ratio 522 can be 50%.

In an embodiment, the surrogate model 511 can predict the candidate code probability 514 by predicting the probability of generating a remainder code 508 given a prefix code obtained from a candidate code 501 by computing the rightmost token logits.

In an embodiment, the machine-filled codes probabilities 515 can be predicted by the surrogate model 511 by predicting the probability of generating a remainder filled code 510 given a prefix filled code 509 obtained from a machine-filled code 505. In an embodiment, the prefix filled code 509 and remainder filled code 510 can be obtained by splitting the machine-filled code by a split ratio 522. In an embodiment, the split ratio 522 can be 90%. In another embodiment, the split ratio can be 50%.

In an embodiment, the surrogate model 511 can predict the machine-filled codes probabilities 515 by predicting the probability of generating a remainder filled code 510 given a prefix filled code 509 obtained from a machine-filled code 505 by computing the rightmost token logits.

In another embodiment, n-grams 519 of the candidate code 501 and the machine-filled codes can be obtained. An n-gram can be a sequence of n adjacent symbols or words in a particular order.

In block 140, the candidate code 501 can be distinguished as AI-generated by comparing the probabilities against a detection threshold 517 to obtain detection result 518.

In an embodiment, the detection threshold 517 can be a predetermined ratio that can be an element of zero to one. In an embodiment, the detection threshold 517 can be 0.9. In another embodiment, the detection threshold 517 can be 0.95. The detection threshold 517 can be obtained by maintaining a True Positive Rate (TPR) while minimizing the False Positive Rate (FPR).

In an embodiment, the probabilities of the machine-filled codes 515 and the candidate code 514 can be compared against detection threshold 517 to obtain detection result 518 with the following:

$$p(Y_0|X) - \frac{1}{N}\sum_{n=1}^{N} p(Y_n|X_n) > T$$

where $p(Y_0|X)$ can be the candidate code probability 514 which can be the probability of generating remainder code 508 ($Y_0$) based on prefix code 507 (X); $p(Y_k|X)$ is the machine filed codes probabilities 515 which can be the probability of obtaining remainder filled code 510 ($Y_n$) based on corresponding prefix filled code 509 (Xn); N can be a number of machine-filled codes, n can be an element of N, and T can be the detection threshold 517.

In another embodiment, a candidate code 501 can be distinguished as AI generated by comparing n-gram divergences 519 of the candidate code 501 and machine-filled codes 505 against a detection threshold 517 to obtain detection result 518. To compute the n-gram divergences 519 of the candidate code 501 and the machine-filled codes 505 can be obtained by the following:

$$\frac{1}{K}\sum_{k=1}^{K}\sum_{n=n_0}^{N} f(n) \frac{|\text{grams}(Y_k, n) \cap \text{grams}(Y_0, n)|}{|Y_k||\text{grams}(Y_0, n)|} > T;$$

where grams(Y, n) can denote a set of all sequence n-grams 504 in sequence Y, Y can include sequences of remainder code $Y_0$ from the candidate code 501 for the candidate code 501 n-gram, and sequences of remainder filled code 510 $Y_k$ for machine-filled codes 505 n-gram, k can be an element of sample size K, N can be a number of sequences, f(n) can be an empirically chosen weight function for different lengths n, $|Y_k|$ can be a normalized length of sequence Yk used to normalize grams ($Y_0$, n), and T can be the detection threshold 517. In an embodiment, f(n) can be nlog(n), $n_0$=4, and N=25.

In another embodiment, the model output probabilities 513 of the candidate code 501 and machine-filled codes 505 can be obtained from the surrogate model 511 and compared against detection threshold 517 to obtain detection result 518.

$$\frac{1}{N}\sum_{k=1}^{K} \log \frac{p(Y_0|X)}{p(Y_k|X)} > T;$$

where $p(Y_0|X)$ can be a model output probability of remainder code sequence $Y_0$ and prefix code X; $p(Y_k|X)$ can be a model output probability of remainder filled code sequence $Y_k$ and prefix filled code X; k can be a number within sample size K; N can be a number of sequences, and T can be the detection threshold 517.

Referring now to FIG. 2, a block diagram showing a computing system for detecting AI generated computer code 500, in accordance with an embodiment of the present invention.

The computing device 500 illustratively includes the processor device 594, an input/output (I/O) subsystem 590, a memory 591, a data storage device 592, and a communication subsystem 593, and/or other components and devices commonly found in a server or similar computing device. The computing device 500 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 591, or portions thereof, may be incorporated in the processor device 594 in some embodiments.

The processor device 594 may be embodied as any type of processor capable of performing the functions described herein. The processor device 594 may be embodied as a single processor, multiple processors, a Central Processing Unit(s) (CPU(s)), a Graphics Processing Unit(s) (GPU(s)), a single or multi-core processor(s), a digital signal processor (s), a microcontroller(s), or other processor(s) or processing/controlling circuit(s).

The memory 591 may be embodied as any type of volatile or non-volatile memory or data storage capable of performing the functions described herein. In operation, the memory 591 may store various data and software employed during operation of the computing device 500, such as operating systems, applications, programs, libraries, and drivers. The memory 591 is communicatively coupled to the processor device 594 via the I/O subsystem 590, which may be embodied as circuitry and/or components to facilitate input/output operations with the processor device 594, the memory 591, and other components of the computing device 500. For example, the I/O subsystem 590 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 590 may form a portion of a system-on-a-chip (SOC) and be incorporated, along with the processor device 594, the memory 591, and other components of the computing device 500, on a single integrated circuit chip.

The data storage device 592 may be embodied as any type of device or devices configured for short-term or long-term storage of data such as, for example, memory devices and circuits, memory cards, hard disk drives, solid state drives, or other data storage devices. The data storage device 592 can store program code for detecting AI generated computer code 100. Any or all of these program code blocks may be included in a given computing system.

The communication subsystem 593 of the computing device 500 may be embodied as any network interface controller or other communication circuit, device, or collection thereof, capable of enabling communications between the computing device 500 and other remote devices over a network. The communication subsystem 593 may be configured to employ any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 500 may also include one or more peripheral devices 592. The peripheral devices 592 may include any number of additional input/output devices, interface devices, and/or other peripheral devices. For example, in some embodiments, the peripheral devices 592 may include a display, touch screen, graphics circuitry, keyboard, mouse, speaker system, microphone, network interface, and/or other input/output devices, interface devices, GPS, camera, and/or other peripheral devices.

Of course, the computing device 500 may also include other elements (not shown), as readily contemplated by one of skill in the art, as well as omit certain elements. For example, various other sensors, input devices, and/or output devices can be included in computing device 500, depending upon the particular implementation of the same, as readily understood by one of ordinary skill in the art. For example, various types of wireless and/or wired input and/or output devices can be employed. Moreover, additional processors, controllers, memories, and so forth, in various configurations can also be utilized. These and other variations of the computing system 500 are readily contemplated by one of ordinary skill in the art given the teachings of the present invention provided herein.

Referring now to FIG. 3, a block diagram showing a software program for detecting AI generated computer code 300, in accordance with an embodiment of the present invention.

In an embodiment, a candidate code 501 can be masked by employing a masking module 502 to obtain perturbed codes 503. The perturbed codes 503 having missing codes can be generated by employing an AI code generator model 504 to obtain machine-filled codes 505. The candidate code 501 can be split into a prefix code 507 and a remainder code 508 by employing a splitting module 506. The machine-filled codes 505 can be split into prefix filled codes 509 and remainder filled codes 510. A candidate code probability 514 can be predicted by utilizing the prefix code 507 and the remainder code 508 and by employing the prediction module 512. Machine-filled codes probabilities 515 can be predicted by utilizing prefix filled codes 509 and remainder filled codes 510 and by employing the prediction module 512. The prediction module can utilize the surrogate model 511. The surrogate model 511 can be employed to obtain model output probabilities 513. The detection result 518 can be obtained by comparing candidate code probability 514 and machine-filled codes probabilities 515 against a detection threshold 517.

In another embodiment, detection result 518 can be obtained by comparing N-gram divergences 519 of remainder code 508 and remainder filled codes 510 against a detection threshold 517. In another embodiment, detection result 518 can be obtained by comparing model output probabilities 513 of remainder code 508 over prefix code 507 and remainder filled codes 510 over corresponding prefix filled codes 509 against a detection threshold 517.

Figure 4:
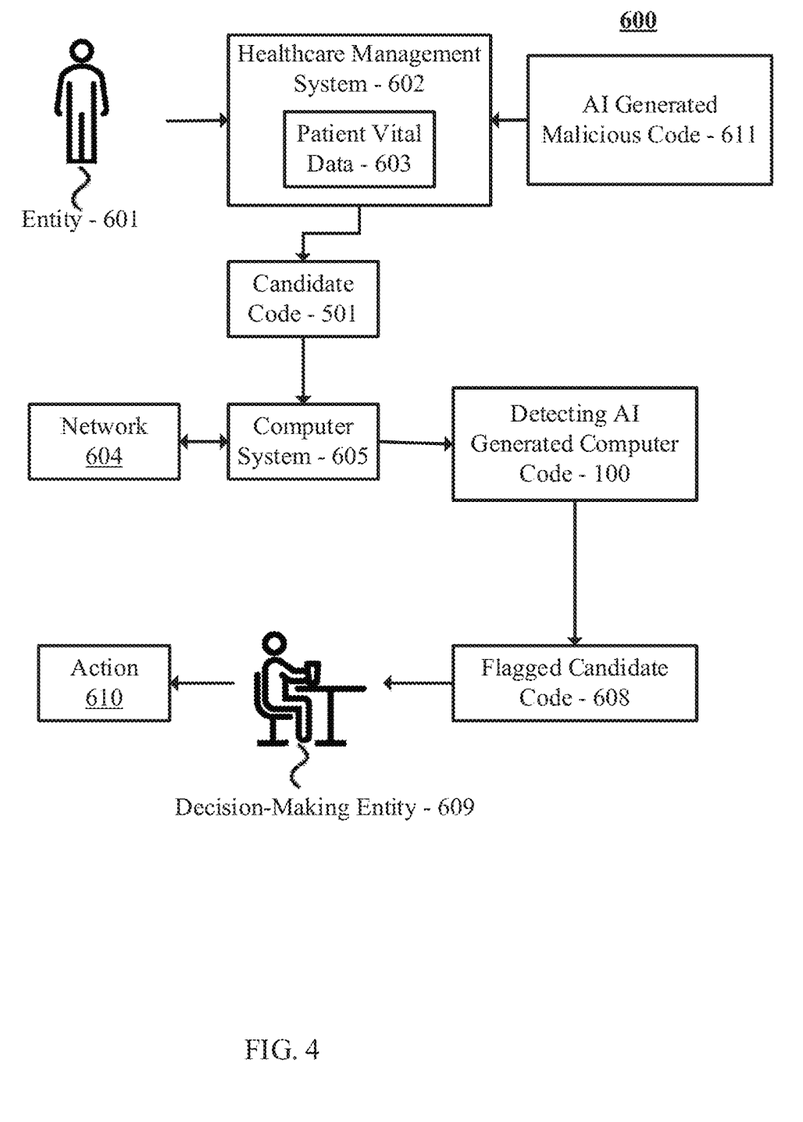
FIG. 4 is a block diagram illustrating a system integrating a practical application for detecting AI-generated computer code, in accordance with an embodiment of the present invention.

Referring now to FIG. 4, a block diagram showing a system integrating a practical application for detecting AI generated computer code 600, in accordance with an embodiment of the present invention.

In an embodiment, an entity 601 can obtain candidate code 501 from healthcare management system 602 that can contain patient vital data 603. AI generated malicious code 611 can be introduced to healthcare management system 602 that can induce potential security risks such as a data breach and expose patient vital data 603 to malicious actors. The candidate code 501 can be inputted into computer system 605 that implements detecting AI generated computer code 100 to obtain flagged candidate code 608. The flagged candidate code 608 can be presented to decision-making entity 609 to perform an action 610. The action 610 can be patching the healthcare management system 602 to secure the data breach and remove the flagged candidate code 608 as malicious code. In another embodiment, the decision-making entity 609 can update the configuration of the healthcare management system 602 to autonomously perform the action 610.

In another embodiment, AI generated malicious code 611 can be introduced to healthcare management system 602 that can generate false patient vital data. The action 610 can be patching the healthcare management system 602 to remove the false patient vital data and remove the flagged candidate code 608 as malicious code. In another embodiment, the decision-making entity 609 can update the configuration of the healthcare management system 602 to autonomously perform the action 610.

In another embodiment, AI generated malicious code 611 can be introduced to healthcare management system 602 that can generate false or incorrect medical diagnosis based on patient vital data 603. The action 610 can be patching the healthcare management system 602 to remove the false or incorrect medical diagnosis and remove the flagged candidate code 608 as malicious code. In another embodiment, the decision-making entity 609 can update the configuration of the healthcare management system 602 to autonomously perform the action 610.

In another embodiment, AI generated malicious code 611 can be introduced to healthcare management system 602 that can generate inappropriate information such as hate speech, obscenities, defamatory language, threats, blackmail, etc., based on patient vital data 603. The action 610 can be patching the healthcare management system 602 to remove the inappropriate information such as hate speech, obscenities, defamatory language, threats, blackmail, etc., and remove the flagged candidate code 608 as malicious code. In another embodiment, the decision-making entity 609 can update the configuration of the healthcare management system 602 to autonomously perform the action 610.

In another embodiment, the healthcare management system 602 can be a different computer system not limited to healthcare, such as enterprise systems, public systems, educational institution systems, etc. Other computer systems are contemplated.

For the following embodiments, the system 602 can be an enterprise system, public data system, educational institution system, etc.

In another embodiment, the action 610 can be a decision-making entity 609 approving the flagged candidate code 608 as adhering to best practices, coding conventions, or quality standards. The system 602 can then merge the approved candidate code with the main codebase.

In another embodiment, the action 610 can be a decision-making entity 609 labeling the flagged candidate code 608 as plagiarized. The system 602 can then provide evidence of plagiarism to the decision-making entity and the author of the candidate code 501.

In another embodiment, the action 610 can be a decision-making entity 609 checking the flagged candidate code 608 for debugging and maintenance. The system 602 can then create code flags that can include flagged candidate code 608 for debugging.

In another embodiment, the action 610 can be creating code hooks including the flagged candidate code 608 that would flag code behavior and target testing strategies to ensure the correctness and reliability of the software being developed.

In another embodiment, the action 610 can be labelling the flagged candidate code 608 as containing redundancies, unnecessary complexity, or inefficient constructs for refactoring and optimizing the code for improved performance and maintainability.

In another embodiment, the action 610 can be alerting the original author of a flagged candidate code 608 as proprietary code that has been detected in an unauthorized use of such code.

Figure 5:
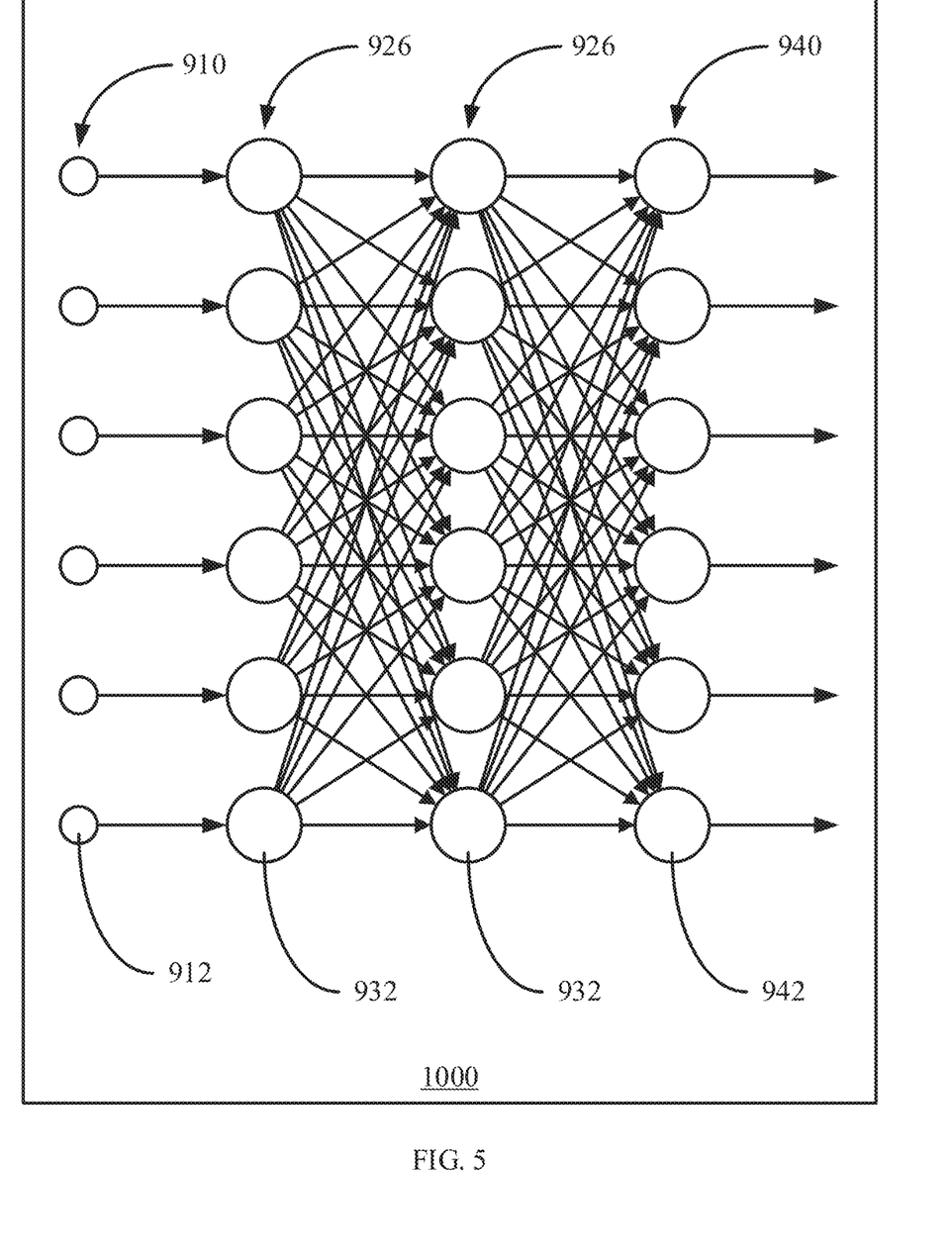
FIG. 5 is a block diagram illustrating an overview of deep learning neural networks, in accordance with an embodiment of the present invention.

Referring now to FIG. 5, a block diagram showing an overview of deep learning neural networks, in accordance with an embodiment of the present invention.

A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be output.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

The deep neural network 1000, such as a multilayer perceptron, can have an input layer 911 of source nodes 912, one or more computation layer(s) 926 having one or more computation nodes 932, and an output layer 940, where there is a single output node 942 for each possible category into which the input example could be classified. An input layer 911 can have a number of source nodes 912 equal to the number of data values 912 in the input data 911. The computation nodes 932 in the computation layer(s) 926 can also be referred to as hidden layers, because they are between the source nodes 912 and output node(s) 942 and are not directly observed. Each node 932, 942 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots, w_{n-1}, w_n$. The output layer provides the overall response of the network to the inputted data. A deep neural network can be fully connected, where each node in a computational layer is connected to all other nodes in the previous layer, or may have other configurations of connections between layers. If links between nodes are missing, the network is referred to as partially connected.

In an embodiment, the computation layers 926 of the AI code generator model 504 can generate series of sequences of code based on a candidate code 501, and the context and syntax of the candidate code 501. The output layer 940 of the AI code generator model 504 can then provide the overall response of the network to the candidate text 501 as a generated missing code 520. In another embodiment, the computation layers 926 of the surrogate model 511 can generate probability weights of the generated missing code 520 sequences based on the candidate code 501. The output layer 940 of the surrogate model 511 can then provide the overall response of the network to the candidate code 501 as a generated missing code 502 and a model output probability 513.

Training a deep neural network can involve two phases, a forward phase where the weights of each node are fixed and the input propagates through the network, and a backwards phase where an error value is propagated backwards through the network and weight values are updated.

The computation nodes 932 in the one or more computation (hidden) layer(s) 926 perform a nonlinear transformation on the input data 912 that generates a feature space. The classes or categories may be more easily separated in the feature space than in the original data space.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for detecting artificial intelligence (AI) generated computer code, comprising:
   masking lines of code from a candidate code to obtain perturbed codes;
   generating missing code from the perturbed codes by employing an AI code generator model to obtain machine-filled codes;
   predicting probabilities of the candidate code and the machine-filled codes as AI-generated by employing a surrogate model; and
   distinguishing the candidate code as AI-generated by comparing the probabilities against a detection threshold to obtain detection results.

2. The computer-implemented method of claim 1, further comprising flagging the candidate code as AI-generated to detect malicious code for a decision-making entity to perform an action.

3. The computer-implemented method of claim 2, wherein the action is securing a healthcare management system handling patient vital data by patching the flagged candidate code for potential security risks.

4. The computer-implemented method of claim 1, wherein predicting probabilities further comprises predicting the candidate code probability by predicting the probability of generating a remainder code given a prefix code.

5. The computer-implemented method of claim 4, wherein distinguishing the candidate code further comprises comparing n-gram divergence of a prefix code and a remainder code and n-gram divergence of prefix filled codes and remainder filled codes.

6. The computer-implemented method of claim 1, wherein predicting probabilities further comprises predicting machine-filled codes probabilities by predicting the probability of generating a remainder filled code given a prefix filled code.

7. The computer-implemented method of claim 1, wherein distinguishing the candidate code further comprises computing a difference between the candidate code probability and the machine-filled codes probabilities.

8. A system for detecting artificial intelligence (AI) generated computer code, comprising:
   a memory; and
   one or more processor devices in communication with the memory configured to:
   mask lines of code from a candidate code to obtain perturbed codes;
   generate missing code from the perturbed codes by employing an AI code generator model to obtain machine-filled codes;
   predict probabilities of the candidate code and the machine-filled codes as AI-generated by employing a surrogate model; and
   distinguish the candidate code as AI-generated by comparing the probabilities against a detection threshold to obtain detection results.

9. The system of claim 8, further comprising the processor device flagging the candidate code as AI-generated to detect malicious code for a decision-making entity to perform an action.

10. The system of claim 9, wherein the processor device performs the action securing a healthcare management system handling patient vital data by patching the flagged candidate code for potential security risks.

11. The system of claim 8, wherein predicting probabilities by the processor device further comprises predicting the candidate code probability by predicting the probability of generating a remainder code given a prefix code.

12. The system of claim 11, wherein distinguishing the candidate code by the processor device further comprises comparing n-gram divergence of a prefix code and a remainder code and n-gram divergence of prefix filled codes and remainder filled codes.

13. The system of claim 8, wherein predicting probabilities by the processor device further comprises predicting machine-filled codes probabilities by predicting the probability of generating a remainder filled code given a prefix filled code.

14. The system of claim 8, wherein distinguishing the candidate code by the processor device further comprises computing a difference between the candidate code probability and the machine-filled codes probabilities.

15. A non-transitory computer program product comprising a computer-readable storage medium including program code for detecting artificial intelligence (AI) generated computer code, wherein the program code when executed on a computer causes the computer to perform:
   masking lines of code from a candidate code to obtain perturbed codes;
   generating missing code from the perturbed codes by employing an AI code generator model to obtain machine-filled codes;
   predicting probabilities of the candidate code and the machine-filled codes as AI-generated by employing a surrogate model; and
   distinguishing the candidate code as AI-generated by comparing the probabilities against a detection threshold to obtain detection results.

16. The non-transitory computer program product of claim 15, further comprising flagging the candidate code as AI-generated to detect malicious code for a decision-making entity to perform an action.

17. The non-transitory computer program product of claim 16, wherein the action is securing a healthcare management system handling patient vital data by patching the flagged candidate code for potential security risks.

18. The non-transitory computer program product of claim 15, wherein predicting probabilities further comprises predicting the candidate code probability by predicting the probability of generating a remainder code given a prefix code.

19. The non-transitory computer program product of claim 15, wherein predicting probabilities further comprises predicting machine-filled codes probabilities by predicting the probability of generating a remainder filled code given a prefix filled code.

20. The non-transitory computer program product of claim 18, wherein distinguishing the candidate code further comprises computing a difference between the candidate code probability and the machine-filled codes probabilities.

\* \* \* \* \*